United States Patent
Ikeda et al.

(10) Patent No.: US 9,779,852 B2
(45) Date of Patent: Oct. 3, 2017

(54) ROTATING ELECTRICAL MACHINE

(71) Applicant: Hitachi, Ltd., Chiyoda-ku, Tokyo (JP)

(72) Inventors: Kenji Ikeda, Tokyo (JP); Hiroaki Kojima, Tokyo (JP); Motonobu Iiduka, Tokyo (JP); Shoichi Maruyama, Tokyo (JP); Kengo Ueda, Tokyo (JP); Daisuke Kamegawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 383 days.

(21) Appl. No.: 14/700,393

(22) Filed: Apr. 30, 2015

(65) Prior Publication Data
US 2015/0340920 A1 Nov. 26, 2015

(30) Foreign Application Priority Data

May 20, 2014 (JP) ................................. 2014-103904

(51) Int. Cl.
*H02K 3/34* (2006.01)
*H01B 3/40* (2006.01)
(Continued)

(52) U.S. Cl.
CPC ............ *H01B 3/40* (2013.01); *C09D 163/00* (2013.01); *H02K 3/30* (2013.01); *H02K 3/34* (2013.01); *H02K 3/40* (2013.01); *H02K 15/12* (2013.01)

(58) Field of Classification Search
CPC . H02K 3/30; H02K 15/12; H02K 3/34; C09D 163/00; H01B 3/40
(Continued)

(56) References Cited

U.S. PATENT DOCUMENTS

| 4,204,181 A | 5/1980 | Smith et al. |
| 5,416,373 A | 5/1995 | Maruyama et al. |

(Continued)

FOREIGN PATENT DOCUMENTS

| EP | 0 810 249 A2 | 12/1997 |
| JP | 59-185147 A | 10/1984 |

(Continued)

OTHER PUBLICATIONS

European Search Report issued in counterpart European Application No. 15166165.9 dated Nov. 12, 2015 (five pages).

*Primary Examiner* — Hanh Nguyen
(74) *Attorney, Agent, or Firm* — Crowell & Moring LLP

(57) ABSTRACT

The rotating electrical machine of the present invention includes a stator coil obtained by curing the impregnating resin injected into the whole stator coil unit after an electrically insulated coil unit with a mica tape having been wrapped around a conductor is slotted into stator iron core slots via a slot liner. The high-heat-resistance resin component of the slot liner contains at least an epoxy resin having 3 or more epoxy groups. The high-heat-resistance resin component of the mica tape contains at least an alicyclic epoxy resin. The impregnating resin contains a bifunctional epoxy resin, and an acid curing agent having one acid anhydride skeleton. With the impregnating resin, the high-heat-resistance resin components of the slot liner and the mica tape form a liner cured portion and a mica insulating layer portion as an integral unit of different resin compositions inside the slot.

6 Claims, 2 Drawing Sheets

(a) CROSS SECTIONAL ELEVATIONAL VIEW OF STATOR COIL (b) CROSS SECTIONAL ENLARGED VIEW OF IRON CORE SLOT

(51) Int. Cl.
*H02K 3/30* (2006.01)
*H02K 3/40* (2006.01)
*C09D 163/00* (2006.01)
*H02K 15/12* (2006.01)

(58) Field of Classification Search
USPC .................................................. 310/215, 214
See application file for complete search history.

(56) References Cited

U.S. PATENT DOCUMENTS

| | | | |
|---|---|---|---|
| 5,982,056 A * | 11/1999 | Koyama | C08G 59/38 310/216.001 |
| 2007/0252449 A1* | 11/2007 | Ikeda | H01B 3/40 310/45 |
| 2012/0038239 A1* | 2/2012 | Ikeda | H01B 3/04 310/215 |
| 2012/0169172 A1* | 7/2012 | Anderton | H02K 3/30 310/214 |
| 2013/0147307 A1* | 6/2013 | Morooka | H02K 3/40 310/215 |

FOREIGN PATENT DOCUMENTS

| | | |
|---|---|---|
| JP | 6-105496 A | 4/1994 |
| JP | 7-250443 A | 9/1995 |
| JP | 9-316617 A | 12/1997 |
| JP | 2010-193673 A | 9/2010 |

* cited by examiner

[FIG. 1]
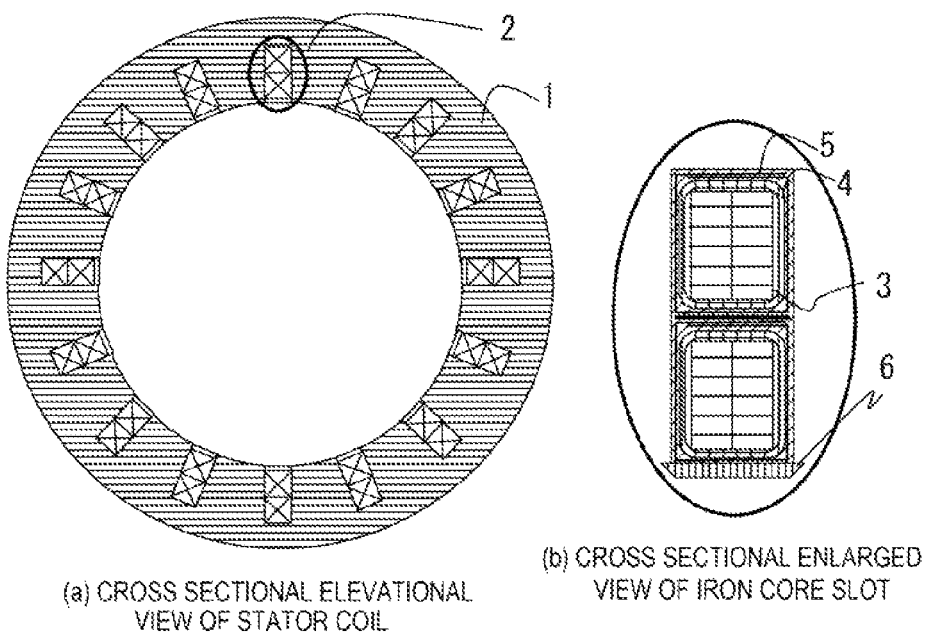
(a) CROSS SECTIONAL ELEVATIONAL VIEW OF STATOR COIL
(b) CROSS SECTIONAL ENLARGED VIEW OF IRON CORE SLOT
[FIG. 2]
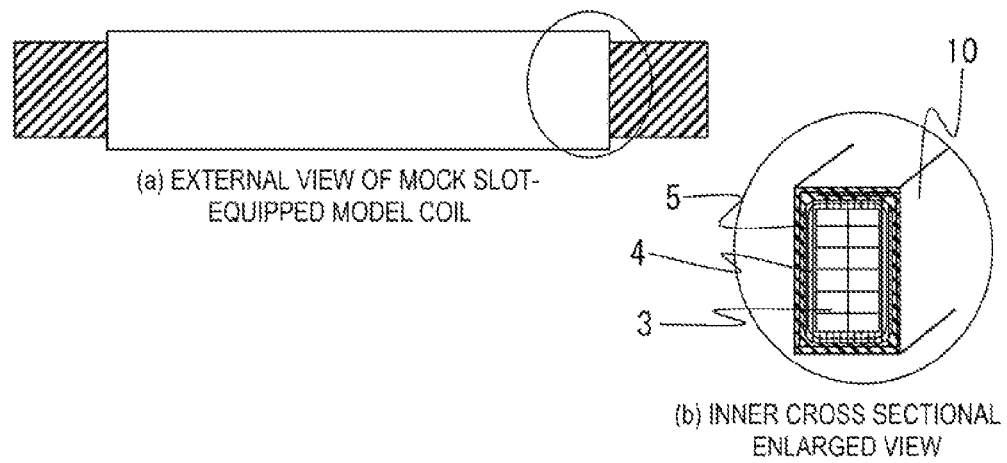
(a) EXTERNAL VIEW OF MOCK SLOT-EQUIPPED MODEL COIL
(b) INNER CROSS SECTIONAL ENLARGED VIEW

[FIG. 3]
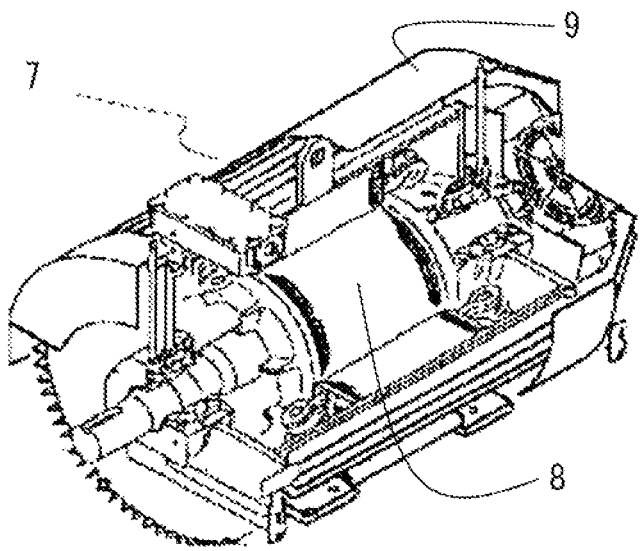
CROSS SECTIONAL PERSPECTIVE VIEW OF ROTATING ELECTRICAL
MACHINE USING THE STATOR COIL OF THE PRESENT INVENTION

ROTATING ELECTRICAL MACHINE

CLAIM OF PRIORITY

The present application claims priority from Japanese Patent Application JP 2014-103904 filed on May 20, 2014, the content of which is hereby incorporated by reference into this application.

BACKGROUND OF THE INVENTION

1. Field of the Invention

The present invention relates to a rotating electrical machine that uses a stator coil obtained by curing the impregnating resin injected into an electrically insulated coil unit housed inside a slot via a slot liner.

2. Description of the Related Art

Rotating electrical machines such as the induction motor of railway cars, industrial induction motors, and generators have size and weight reduction requirements. One way to meet such demands is to improve the heat resistance of the insulation system adopted by the stator coil. During the operation of the stator coil, the temperature inside the slots surrounded by the iron core becomes higher than the temperatures of the coil end portion and the lead wire portion. Under these backgrounds, there is a need for a technique that can selectively improve the heat resistance of the insulation system inside the slots. For improved production efficiency and costs, the insulation system also requires a technique to improve heat resistance such as by using a general-purpose impregnating resin with a temperature tolerance class of 155 (which is defined in JIS (Japanese Industrial Standards) C 4003:2010) or less (insulation system with a temperature tolerance class of 180 (which is defined in JIS (Japanese Industrial Standards) C 4003:2010) or more). As an example, an insulation system is available that is configured from an impregnating resin, a mica tape, and a slot liner.

CITATION LIST

Patent Literature

Patent Literature 1: JP-A-59-185147
Patent Literature 2: JP-A-06-105496
Patent Literature 3: JP-A-07-250443
Patent Literature 4: JP-A-09-316617
Patent Literature 5: JP-A-2010-193673

SUMMARY OF INVENTION

Technical Problem

The present invention is intended to provide a rotating electrical machine having excellent high-temperature electrical insulation by improving the heat resistance of the insulation system inside the slots of a stator coil with the use of a general-purpose impregnating resin of a long usable time containing a bifunctional epoxy resin and an acid curing agent.

Solution to Problem

As a solution to the foregoing problems, the invention uses, for example, the configurations set forth in the appended claims. The present invention includes plural means to solve the foregoing problems. As an example, the invention provides a rotating electrical machine that includes a stator coil obtained by curing the impregnating resin injected into the whole stator coil unit after an electrically insulated coil unit with a mica tape having been wrapped around a conductor is slotted into a stator iron core slot via a slot liner. The high-heat-resistance component of the slot liner contains at least an epoxy resin having 3 or more epoxy groups. The high-heat-resistance component of the mica tape contains at least an alicyclic epoxy resin. The impregnating resin contains a bifunctional epoxy resin and an acid curing agent. With the impregnating resin, the high-heat-resistance components of the slot liner and the mica tape form a liner cured portion and a mica insulating layer portion as an integral unit of different resin compositions inside the slot.

Advantageous Effects of Invention

The present invention can advantageously improve the heat resistance of the insulation system inside the slots of a stator coil with the use of a general-purpose impregnating resin of a long usable time that is available at low material cost. The invention also can advantageously provide a rotating electrical machine having excellent electrical insulation.

BRIEF DESCRIPTION OF DRAWINGS

FIG. 1 represents a cross sectional elevational view of a stator coil of the present invention, and a cross sectional enlarged view of an iron core slot.

FIG. 2 represents an external view of a mock slot-equipped model coil of the present invention, and an inner cross sectional enlarged view.

FIG. 3 shows a rotating electrical machine of the present invention.

DESCRIPTION OF EMBODIMENTS

The stator coil for rotating electrical machines is produced by using the whole impregnation technique, as follows.

In the whole impregnation method, an electrically insulated coil unit with a mica tape having been wrapped around an insulation-coated, molded conductor of a prescribed shape is slotted into a stator iron core slot via a slot liner, and connected at the outer end portion of the iron core to obtain a stator coil unit. An impregnating resin is then injected into the stator coil unit in a vacuum under applied pressure, and heat cured to produce the stator coil.

FIG. 1 shows an example of (a) a cross sectional elevational view of a stator coil produced by using the whole impregnation method, and (b) a cross sectional enlarged view of an iron core slot. The stator coil is configured primarily from an iron core 1, and slots 2 containing a conductor and an insulation system. Inside of the iron core slot 2 encircled in the figure are a conductor 3; a mica insulating layer portion 4 formed of a mica tape with a high-heat-resistance component, and an impregnating resin; a liner cured portion 5 formed of a slot liner with a high-heat-resistance component, and an impregnating resin; and a wedge 6.

In the related art, there is no disclosure of a technique that selectively increases the heat resistance of the insulation system inside the slots. However, PTLs 1 to 5 disclose improving the heat resistance of a stator coil for rotating electrical machines. PTLs 1 to 4 are methods for improving the heat resistance of the impregnating resin in the insulation system of a stator coil. Specifically, these publications disclose configurations in which the heat resistance of the insulating system is improved with a trifunctional epoxy resin used as a constituting material of the impregnating resin. A possible drawback of the trifunctional epoxy resin, however, is that the impregnating resin using the trifunctional epoxy resin has a usable time (also called a pot life) which is only about 30 to 60 days.

PTL 5 is a method for improving the heat resistance of a mica tape binder in the insulation system of a stator coil. Specifically, a multifunctional epoxy resin and a bifunctional acid curing agent are used for the mica tape binder, and the binder is used with an impregnating resin containing an epoxy resin and an acid curing agent. The equivalent ratio of the binder, and the epoxy resin and the acid curing agent of the impregnating resin is adjusted to allow the cure reaction to uniformly take place, and to thereby improve the heat resistance of the insulation system. However, this publication does not describe an idea or a configuration for improving the heat resistance of the slot liner and the surrounding portion inside the slot, and the heat resistance around the slot liner probably remains low.

The following specifically describes the slot liner, the mica tape, the impregnating resin, the mock slot-equipped model coil, the stator coil, and the rotating electrical machine of the present invention.

[Slot Liner]

The slot liner of the present invention may use a plastic film, and an aramid film is preferably used in terms of heat resistance, mechanical property, and electrical insulation.

[High-Heat-Resistance Resin Component of Slot Liner]

The slot liner contains a high-heat-resistance resin component, preferably a resin composition containing an epoxy resin having 3 or more epoxy groups. This is preferable because it can improve the heat resistance of the slot liner portion cured with the impregnating resin injected around the slot liner and into the slots in the vicinity of the iron core. Another reason is that such a resin composition can improve the adhesion of the slot liner for the iron core and the mica tape portion, and thus the electrical insulation of the coil. Examples of known such epoxy resins having 3 or more epoxy groups include tris(hydroxyphenyl)alkanes and tetrakis(hydroxyphenyl)alkanes. Examples of the trifunctional epoxy resin include tris(hydroxyphenyl)methane-type epoxy resin, tris(hydroxyphenyl)ethane-type epoxy resin, and tris(hydroxyphenyl) propane-type epoxy resin. Examples of the tetrafunctional epoxy resin include tetrakis(hydroxyphenyl)methane-type epoxy resin, tetrakis(hydroxyphenyl)ethane-type epoxy resin, tetrakis(hydroxyphenyl)propane-type epoxy resin, and tetrafunctional polyglycidylamine-type epoxy resin. The high-heat-resistance resin component may also contain a heat-latent curing promoting agent, in addition to the epoxy resin having 3 or more epoxy groups. Preferred examples of the heat-latent curing promoting agent include heat-latent metallic acetylacetonates, and epoxy adduct compounds of imidazole. These are effective at improving the cure reactivity to the high-heat-resistance resin component of the slot liner, and the impregnating resin, and improving the heat resistance of the cured product. The high-heat-resistance resin component also may contain an inorganic or organic filler to improve or optimize the electrical, mechanical, and thermal properties.

[Mica Tape]

The mica tape used in the present invention may be configured from a plastic film, glass cloth, mica paper, and a binder. The plastic film and glass cloth are base materials of the mica tape, and a polyimide film is preferred in terms of heat resistance and electrical insulation, and glass cloth is preferred in terms of heat resistance and mechanical property. The mica paper is preferably laminated mica in terms of electrical insulation.

[High-Heat-Resistance Resin Component of Mica Tape]

The mica tape contains a high-heat-resistance resin component, preferably a resin composition containing a liquid alicyclic epoxy resin. This is preferable because it can improve the ease of wrapping the mica tape around the conductor, and the heat resistance of the mica tape portion cured with the impregnating resin injected around the mica tape. The high-heat-resistance resin component may contain a heat-latent curing promoting agent or a heat-apparent curing promoting agent, in addition to the alicyclic epoxy resin. Preferred examples of the heat-latent curing promoting agent include metallic acetylacetonates, and epoxy adduct compounds of imidazole. Preferred examples of the heat-apparent curing promoting agent include imidazole and derivatives thereof. These are effective at improving the cure reactivity to the high-heat-resistance resin component of the mica tape, and the impregnating resin, and improving the heat resistance of the cured product.

[Impregnating Resin]

The impregnating resin used in the present invention is preferably configured to include a bifunctional epoxy resin, and an acid curing agent having one acid anhydride skeleton. Advantages of such a configuration include low material cost, short curing time, and long usable time. Examples of the epoxy resin include bisphenol A-type epoxy resin, and bisphenol F-type epoxy resin. The acid curing agent may be an acid curing agent having a single acid anhydride skeleton in its structural formula. Examples of known such acid curing agents include 3- or 4-methyl-hexahydrophthalic anhydride, and methyl-3,6-endo-methylene-1,2,3,6-tetrahydrophthalic anhydride. The impregnating resin may contain a curing promoting agent, preferably a heat-latent metallic acetylacetonate in terms of the usable time of the impregnating resin.

The following specifically describes an example of a stator coil and a rotating electrical machine produced with the insulation system of the present invention containing materials such as the high-heat-resistance resin component-containing mica tape and slot liner, and the impregnating resin, using Examples.

[Mock Slot-Equipped Model Coil]

FIG. 2 shows a mock slot-equipped model coil according to the present invention, along with a cross sectional enlarged view inside the coil. The mock slot-equipped model coil according to the present invention is configured as an integral unit of the mica insulating layer portion 4 and the liner cured portion 5 around the conductor 3. The mica insulating layer portion 4 is formed by curing the high-heat-resistance component-containing mica tape used by the present invention with the impregnating resin used by the present invention. [For example, an epoxy resin composition configured from bisphenol A-type epoxy resin jER 828 (Mitsubishi Chemical Corporation), methylhexahydrophthalic acid anhydride curing agent HN-5500 (Hitachi Chemical Co., Ltd.), and manganese[III] acetylacetonate (Wako Pure Chemical Industries, Ltd.) or cobalt[III] acetylacetonate as the heat-latent curing promoting agent was used.] The liner cured portion 5 is formed by curing the high-heat-resistance component-containing slot liner used by the present invention with the impregnating resin used by the present invention. The mock slot-equipped model coil of the present invention was produced by injecting the impregnating resin used by the present invention into the mock slot after the conductor 3 wrapped with the high-heat-resistance component-containing mica tape used by the present invention is housed inside the mock slot via the high-heat-resistance component-containing slot liner used by the present invention, and curing the impregnating resin as a whole inside the mock slot. The mock slot 10 of the model coil had a 300 mm length.

[Stator Coil]

The stator coil according to the present invention was produced as an integral unit of the mica insulating layer portion and the liner cured portion around the conductor. The mica insulating layer portion was formed by curing the high-heat-resistance component-containing mica tape used by the present invention with the impregnating resin used by the present invention. The liner cured portion was formed by curing the high-heat-resistance component-containing slot liner used by the present invention with the impregnating resin used by the present invention.

[Rotating Electrical Machine]

The stator coil produced as above was assembled with a rotor to produce a rotating electrical machine.

In the Example, the evaluations of various properties were performed by using the following measurement methods and the following conditions.

(1) Heat Resistance Evaluation Based on Dynamic Viscoelasticity of Insulating Cured Product of Insulation System The insulating cured product of Example was obtained by removing the mock slot 10 from the mock slot-equipped model coil of the present invention (FIG. 2), and cutting the conductor and collecting the integral cured portion where the high-heat-resistance component-containing mica tape used by the present invention, and the high-heat-resistance component-containing slot liner used by the present invention were cured with the injected impregnating resin. Glass transition point (hereinafter, simply "Tg") is a measure of heat resistance evaluation. The stator coil and the rotating electrical machine can have higher and more stable high-temperature electrical properties as the Tg of the cured product increases. In the Example, dynamic viscoelasticity (hereinafter, simply "DMA") as an index of the Tg of the cured product was used to measure loss tangent (tan δ), and evaluations were performed at the tan δ peak value temperature. δ DMA was measured to determine a mechanical loss tangent (tan δ DMA) by using a Rheoepectler DVE-V4 (Rheology) under increasing temperatures of from 25° C. to 300° C. at 2° C./min in a pull mode. The span was 20 mm, the measurement frequency was 10 Hz, and the displacement amplitude was 1 μm. The high-temperature (200° C. or more) electrical insulation of the coil and other components can improve when the tan δ DMA peak value temperature is 200° C. or more. Accordingly, the result was "Good" when the tan δ DMA peak value temperature was 200° C. or more, and "Poor" when the tan δ DMA peak value temperature was below 200° C., as indicated inside the bracket [ ] in Tables 1 and 2.

(2) Evaluation of Ease of Wrapping of Mica Tape Around Conductor

Ease of wrapping of the mica tape was determined as either desirable or undesirable depending on how easy it was to wrap the conductor with a mica tape that had been stored (left unattended) in a 25° C. atmosphere for 90 days, as indicated by "Good" or "Poor" inside the bracket [ ] in Tables 1 and 2.

(3) Usable Time Evaluation of Impregnating Resin

For the evaluation of usable time, the usable time of the impregnating resin was defined as the time (days) that doubles the initial viscosity of the impregnating resin at 25° C. Viscosity was measured with a B-type rotary viscometer (Tokyo Keiki).

(4) Electrical Insulation Test (Tan δ) of Mock Slot-Equipped Model Coil and Stator Coil The electrically insulated coil and the stator coil were placed in a 200° C. constant-temperature oven, and measured for tan δ upon applying a rated voltage of 1 kV. The electrical insulation is desirable, and does not pose a problem in high-temperature operations when tan δ at 200° C. is 15% or less. Accordingly, the result is "Good" when tan δ was 15% or less, and "Poor" when tan δ was above 15%, as indicated inside the bracket [ ] in Tables 1 and 2.

The present invention is described below using Examples.

Examples 1 to 6, and Comparative Examples 1 to 4

Examples 1 to 6 describe an example of evaluations of ease of wrapping of the mica tape, Tg of the insulating cured product, usable time of the impregnating resin, and electrical insulation of the mock slot-equipped model coil.

The slot liners of Examples 1 to 6 are aramid films NOMEX® (Du Pont [thickness 0.13 mm]) with the high-heat-resistance resin components presented in Table 1, specifically 1,1,2,2-tetrakis(hydroxyphenyl)ethane-type epoxy resin (Japan Epoxy Resin product jER 1031S), tris(hydroxyphenyl)methane-type epoxy resin (Japan Epoxy Resin product jER 1032H60), tetrafunctional polyglycidylamine-type epoxy resin (Nippon Steel & Sumikin Chemical product YH-434), and manganese[III] acetylacetonate.

The mica tapes of Examples 1 to 6 are constructed from the base material polyimide film [thickness 0.13 mm×width 25 mm] and mica paper bonded to each other with binders containing the high-heat-resistance resin components presented in Table 1, specifically (3',4'-epoxycyclohexane)methyl-3,4-epoxycyclohexanecarboxy late (Daicel Chemical Industries product CEL 2021P), manganese[III] acetylacetonate, epoxy adduct imidazole (Japan Epoxy Resin product P200), and 2-ethyl-4-methylimidazole (Shikoku Chemicals 2E4MZ).

The impregnating resins of Examples 1 to 6 have the compositions presented in Table 1, specifically 100 weight parts of bisphenol A-type epoxy resin jER 828 and methylhexahydrophthalic acid anhydride curing agent HN-5500, and 1 weight part of manganese[III] acetylacetonate or cobalt[III] acetylacetonate.

TABLE 1

|  | Example 1 | Example 2 | Example 3 |
| --- | --- | --- | --- |
| High-heat-resistance resin composition of slot liner | 1,1,2,2-Tetrakis(hydroxyphenyl)ethane-type epoxy resin, manganese[III] acetylacetonate | 1,1,2,2-Tetrakis(hydroxyphenyl)ethane-type epoxy resin, manganese[III] acetylacetonate | Tris(hydroxyphenyl)methane-type epoxy resin, manganese[III] acetylacetonate |

TABLE 1-continued

| | | | |
|---|---|---|---|
| High-heat-resistance resin composition of mica tape | (3',4'-Epoxycyclohexane)methyl-3,4-epoxycyclohexanecarboxylate, epoxy adduct imidazole | (3',4'-Epoxycyclohexane)methyl-3,4-epoxycyclohexanecarboxylate, manganese[III] acetylacetonate | (3',4'-Epoxycyclohexane)methyl-3,4-epoxycyclohexanecarboxylate, epoxy adduct imidazole |
| Impregnating resin composition | Bisphenol A-type epoxy resin, methylhexahydrophthalic acid anhydride curing agent, manganese[III] acetylacetonate | Bisphenol A-type epoxy resin, methylhexahydrophthalic acid anhydride curing agent, cobalt[III] acetylacetonate | Bisphenol A-type epoxy resin, methylhexahydrophthalic acid anhydride curing agent, manganese[III] acetylacetonate |
| Ease of mica tape wrapping (N/m) [Rating] | 20 [Good] | 20 [Good] | 25 [Good] |
| Glass transition point $T_g$ (° C.) of insulating cured product | 210 [Good] | 205 [Good] | 202 [Good] |
| Usable time of impregnating resin (days) | 190 [Good] | 190 [Good] | 190 [Good] |
| Dielectric tangent of model coil electrical insulation at 200° C. (%) | 12.0 [Good] | 13.1 [Good] | 12.5 [Good] |

| | Example 4 | Example 5 | Example 6 |
|---|---|---|---|
| High-heat-resistance resin composition of slot liner | Tris(hydroxyphenyl)methane-type epoxy resin, manganese[III] acetylacetonate | Tetrafunctional polyglycidylamine-type epoxy resin, manganese[III] acetylacetonate | Tetrafunctional polyglycidylamine-type epoxy resin, manganese[III] acetylacetonate |
| High-heat-resistance resin composition of mica tape | (3',4'-Epoxycyclohexane)methyl-3,4-epoxycyclohexanecarboxylate, manganese[III] acetylacetonate | (3',4'-Epoxycyclohexane)methyl-3,4-epoxycyclohexanecarboxylate, 2-ethyl-4-methylimidazole | (3',4'-Epoxycyclohexane)methyl-3,4-epoxycyclohexanecarboxylate, manganese[III] acetylacetonate |
| Impregnating resin composition | Bisphenol A-type epoxy resin, methylhexahydrophthalic acid anhydride curing agent, cobalt[III] acetylacetonate | Bisphenol A-type epoxy resin, methylhexahydrophthalic acid anhydride curing agent, manganese[III] acetylacetonate | Bisphenol A-type epoxy resin, methylhexahydrophthalic acid anhydride curing agent, cobalt[III] acetylacetonate |
| Ease of mica tape wrapping (N/m) [Rating] | 20 [Good] | 20 [Good] | 20 [Good] |
| Glass transition point $T_g$ (° C.) of insulating cured product | 200 [Good] | 205 [Good] | 210 [Good] |
| Usable time of impregnating resin (days) | 190 [Good] | 190 [Good] | 190 [Good] |
| Dielectric tangent of model coil electrical insulation at 200° C. (%) | 13.3 [Good] | 12.3 [Good] | 13.2 [Good] |

Comparative Examples 1 to 4 are presented in Table 2. Comparative Example 1 has the same configuration as Example 1 in the high-heat-resistance resin components of the slot liner and the mica tape. However, the epoxy resin of the impregnating resin was changed to tris(hydroxyphenyl)methane-type epoxy resin. Comparative Example 2 has the same configuration as Example 2, except that the high-heat-resistance resin component of the slot liner was not used. Comparative Example 3 has the same configuration as Example 1, except that the epoxy resin of the high-heat-resistance resin component of the mica tape was changed to tris(hydroxyphenyl)methane-type epoxy resin. Comparative Example 4 has the same configuration as Example 2, except that the epoxy resin of the high-heat-resistance resin component of the slot liner was changed to (3',4'-epoxycyclohexane)methyl-3,4-epoxycyclohexanecarboxylate.

TABLE 2

| | Comparative Example 1 | Comparative Example 2 | Comparative Example 3 | Comparative Example 4 |
|---|---|---|---|---|
| High-heat-resistance resin composition of slot liner | 1,1,2,2-Tetrakis(hydroxyphenyl)ethane-type epoxy resin, manganese[III] acetylacetonate | — | Tris(hydroxyphenyl)methane-type epoxy resin, manganese[III] acetylacetonate | (3',4'-Epoxycyclohexane)methyl-3,4-epoxycyclohexanecarboxylate, manganese[III] acetylacetonate |

TABLE 2-continued

|  | Comparative Example 1 | Comparative Example 2 | Comparative Example 3 | Comparative Example 4 |
|---|---|---|---|---|
| High-heat-resistance resin composition of mica tape | (3',4'-Epoxycyclohexane)methyl-3,4-epoxycyclohexanecarboxylate, epoxy adduct imidazole | (3',4'-Epoxycyclohexane)methyl-3,4-epoxycyclohexanecarboxylate, manganese[III] acetylacetonate | Tris(hydroxyphenyl)methane-type epoxy resin, manganese[III] acetylacetonate | (3',4'-Epoxycyclohexane)methyl-3,4-epoxycyclohexanecarboxylate, manganese[III] acetylacetonate |
| Impregnating resin composition | Tris(hydroxyphenyl)methane-type epoxy resin, methylhexahydrophthalic acid anhydride curing agent, manganese[III] acetylacetonate | Bisphenol A-type epoxy resin, methylhexahydrophthalic acid anhydride curing agent, manganese[III] acetylacetonate | Bisphenol A-type epoxy resin, methylhexahydrophthalic acid anhydride curing agent, manganese[III] acetylacetonate | Bisphenol A-type epoxy resin, methylhexahydrophthalic acid anhydride curing agent, manganese[III] acetylacetonate |
| Ease of mica tape wrapping (N/m) [Rating] | 25 [Good] | 20 [Good] | 60 [Poor] | 20 [Good] |
| Glass transition point $T_g$ (° C.) of insulating cured product | 205 [Good] | 170 [Poor] | 175 [Poor] | 190 [Poor] |
| Usable time of impregnating resin (days) | 40 [Poor] | 190 [Good] | 190 [Good] | 190 [Good] |
| Dielectric tangent of model coil electrical insulation at 200° C. (%) | 13.0 [Good] | 28.1 [Poor] | 27.0 [Poor] | 25.5 [Poor] |

Examples 1 to 6 satisfied all the required values for ease of mica tape wrapping, Tg of insulating cured product, pot of the impregnating resin, usable time, and mock slot-equipped model coil properties. On the other hand, the results did not satisfy the required property values for the usable time of the impregnating resin (Comparative Example 1), the Tg of the insulating cured product, and the electrical insulation of the model coil (Comparative Example 2), ease of mica tape wrapping, and the electrical insulation of the model coil (Comparative Example 3), and the Tg of the insulating cured product, and the electrical insulation of the model coil (Comparative Example 4).

The foregoing Examples used general-purpose impregnating resins that used a bifunctional epoxy resin and an acid curing agent, and the slot liner and the mica tape used different insulation system materials containing different high-heat-resistance resin components. This was effective at improving the ease of mica tape wrapping, the usable time of the impregnating resin, the heat resistance of the insulation system material (cured product) inside the slot, and the electrical insulation of the mock slot-equipped model coil.

Example 7

The following describes an example in which the stator coil produced with the configuration of the insulating cured product of the present invention was applied to the rotating electrical machine of the present invention.

The rotating electrical machine of Example 7 was produced with the stator coil configured from the insulation system materials of Example 2. As shown in FIG. 3, a stator coil 7, a rotor coil 8, and other components were assembled and wired to produce a rotating electrical machine 9.

Example 7 used a general-purpose impregnating resin that used a bifunctional epoxy resin and an acid curing agent, and the slot liner and the mica tape used different insulation system materials containing different high-heat-resistance resin components. This was effective at obtaining the rotating electrical machine that had excellent electrical insulation under high temperature (200° C.)

REFERENCE SIGNS LIST

1: iron core, 2: slot, 3: conductor, 4: mica insulating layer portion, 5: liner cured portion, 6: wedge, 7: stator coil, 8: rotor coil, 9: rotating electrical machine, 10: mock slot

The invention claimed is:

1. A rotating electrical machine comprising a stator coil and an electrically insulated coil slotted therein via a slot liner, the electrically insulated coil including a conductor, and a mica tape wrapped around the conductor,
   wherein the slot liner and the mica tape are cured with an impregnating resin,
   wherein a liner cured portion formed of the slot liner and the impregnating resin contains an epoxy resin having 3 or more epoxy groups, a bifunctional epoxy resin, and an acid curing agent having one acid anhydride skeleton, and
   wherein a mica cured portion formed of the mica tape and the impregnating resin contains an alicyclic epoxy resin, a bifunctional epoxy resin, and an acid curing agent having one acid anhydride skeleton.

2. The rotating electrical machine according to claim 1, wherein the liner cured portion and the mica cured portion form an integral unit inside a slot.

3. The rotating electrical machine according to claim 1, wherein the slot liner before curing contains an epoxy resin having 3 or more epoxy groups, and a curing promoting agent.

4. The rotating electrical machine according to claim 1, wherein the mica tape before curing contains an alicyclic epoxy resin, and a curing promoting agent.

5. The rotating electrical machine according to claim 1, wherein the impregnating resin before curing contains a heat-latent curing promoting agent.

6. The rotating electrical machine according to claim 5, wherein the heat-latent curing promoting agent is manganese[III] acetylacetonate or cobalt[III] acetylacetonate.

\* \* \* \* \*